June 12, 1962 H. ARENSON 3,038,194
HOLLOW STEM CONNECTOR AND SUPPORT
Filed May 1, 1958 2 Sheets-Sheet 1

INVENTOR.
Herbert Arenson.
BY
Fishburn and Gold
ATTORNEYS.

June 12, 1962 — H. ARENSON — 3,038,194
HOLLOW STEM CONNECTOR AND SUPPORT
Filed May 1, 1958 — 2 Sheets-Sheet 2

INVENTOR.
Herbert Arenson.
BY
Fishburn and Gold
ATTORNEYS.

United States Patent Office

3,038,194
Patented June 12, 1962

3,038,194
HOLLOW STEM CONNECTOR AND SUPPORT
Herbert Arenson, % Childlore Company,
210 W. 15th St., Kansas City, Mo.
Filed May 1, 1958, Ser. No. 732,243
1 Claim. (Cl. 16—43)

This invention relates to hollow stem connectors and supports, and more particularly to mountings or fasteners for support devices on hollow stem articles, such as legs of furniture and the like as for securing glides, casters and the like to tubular legs or legs having an open end socket therein.

Glides of various forms and casters have been used on legs of furniture with portions extending into sockets or hollow legs to hold said glides and casters. Such mountings have included shanks with resilient fingers to engage the inside of the leg wall and/or rubber collars to frictionally engage the wall to hold the glides and casters. Also, rubber collars have been used on threaded shanks with nuts thereon to apply a compression force longitudinally thereof to swell the collar into engagement with the inside of the wall to frictionally secure the mounting in said hollow leg; however, the mountings are subject to vibration during shipping and handling, the rubber deteriorates with age, and movement such as tipping of chairs applies stress to the supports and mountings resulting in the glides and casters becoming loose or dropping out of the legs. This is a source of annoyance and expense to dealers and customers in replacing the support members, and in many instances the absence of the support in the leg is unnoticed and subsequent moving of the article causes marring of the floor or other surface on which the article rests.

The principal objects of the present invention are to provide a furniture support and mounting structure that will positively lock the support in the leg and avoid the difficulty mentioned above; to provide a fastener or connector for hollow stem articles that consist of a mating sleeve member and insert wherein the interior of the sleeve and exterior of the insert have interfering tapers which when the sleeve is placed in a hollow stem and the insert moved into the sleeve effects a pressure between the sleeve and hollow stem and lock between the sleeve and insert to positively secure the members together; to provide such a structure wherein the mating sleeve and insert members have cooperating interengageable portions that are engaged when the insert and sleeve members are assembled to retain the insert in the sleeve member; to provide such a structure wherein the insert has floor engaging portions carried thereby; to provide such a structure wherein said insert has a swivel glide mounted on the lower end thereof; to provide such a structure wherein the insert receives and mounts caster members or adjustable or leveling glides; to provide such a connector structure with pressure-sensitive adhesive between the contacting surfaces of the sleeve and hollow stem whereby the cooperative bond is capable of withstanding substantial forces tending to separate same; to provide such a structure wherein the adhesive is a double face pressure-sensitive tape; to provide such a structure having a minimum of parts of material having long life, no age hardening or crystallization; and to provide such a hollow stem connector or fastener that is economical to manufacture, easily and quickly assembled in a substantially permanent mounting.

Other objects and advantages of this invention will become apparent from the following description taken in connection with the accompanying drawings wherein are set forth by way of illustration and example certain embodiments of this invention.

Figure 1:
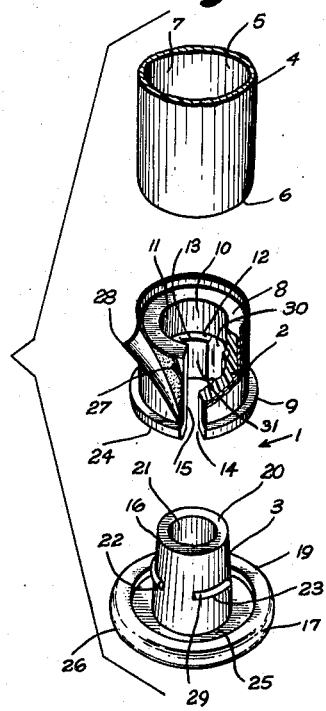
FIG. 1 is a disassembled perspective view of a tubular stem and connector parts wherein the insert has a supporting member thereon.

Referring more in detail to the drawings:

1 designates a connector generally consisting of a sleeve member 2 and an insert member 3 adapted to be used in a hollow stem 4 or other member having a bore 5 or socket opening from an end 6 thereof. In the illustrated structure, the tubular stem 4 is representative of the leg of a piece of furniture, such as a chair, table or the like, and the exterior may be of any contour or shape desired. The bore or socket 5 is of preferably uniform cross section for the length in which the connector is mounted, and while the bore or socket 5 is shown as being cylindrical, it may be of any geometric shape in cross section. The tubular stem may be of any suitable material such as metal, wood or the like, but it is preferable that the inner surface 7 of the socket or bore 5 be relatively smooth.

The sleeve member 2 has a portion 8 of suitable length to extend into the socket 5 and preferably has an enlarged portion or an annular flange 9 at one end of said portion 8. It is preferable that the flange 9 be of suitable size whereby it extends beyond the outer surface of the tubular stem 4 when the sleeve is assembled therein. The sleeve 2 has a bore 10 extending longitudinally thereof, said bore being axial and tapered whereby the sides of the tapered bore 10 converge from the flange end of the sleeve, the greater area of the bore being at the flanged end and the small area of the bore being at the opposite end of said sleeve. The wall 11 of the sleeve 2 has an internal groove 12 preferably substantially midway the length of said sleeve, said groove being of suitable shape to provide a shoulder 13 facing toward the small end of the bore 10. It is preferable that the bore 10 be of circular cross section; however, it can be of any geometric shape, and the exterior of the sleeve portion 8 is of a shape corresponding to the shape of the socket or bore 5 into which it is to be inserted. The sleeve has a longitudinal slot 14 extending the length thereof, and said sleeve is preferably formed of a material having some flexibility whereby the slotted sleeve will normally expand opening the slot 14 whereby the exterior of the sleeve portion 8 is larger than the socket 5, but upon compression to bring the adjacent edges 15 of the slot 14 together the sleeve portion 8 can be easily slipped into the socket 5. The material from which the sleeve 2 is formed is preferably capable of withstanding a great deal of stress without failure, and also should have long life, no age hardening and be substantially inert. The sleeve member is preferably made from a synthetic resin such as polyethylene, and it has been found that low pressure high density polyethylene frequently called "linear polyethylene" is particularly adaptable for this member. However, other flexible plastics such as nylon may be used.

The insert 3 has a shank portion 16 having a taper at the same angle as the taper of the bore 10 of the sleeve 2. In the structure illustrated in FIGS. 1 to 3 inclusive, the insert 3 includes a portion 17 whereby the structure will form a glide for supporting furniture and the like. In such structure, the shank 16 extends upwardly from the support portion or bottom member 17 having a substantially flat bottom surface 18. The bottom member extends outwardly from the large end of the tapered shank 16 and then upwardly as at 19 providing an upstanding flange adapted to surround the exterior of the flange 9 on the sleeve 2, when assembled as illustrated in FIG. 2. The small end 20 of the tapered shank 16 has an axial bore 21 extending therein and terminating in spaced relation to the bottom face 18. An annular rib or bead 22 is on the shank 20 and extends outwardly therefrom, said bead being shaped to provide a downwardly facing shoulder 23 adapted to engage the shoulder 13 when the insert is fully inserted or assembled in the sleeve and/or the bottom face 24 of the flange 9 engages the upper face 25 of the bottom member 17 on the insert. The outer edges of the bottom member 17 are preferably rounded as at 26 to facilitate movement of the glide over irregular surfaces.

The shank 16 is slightly larger in diameter or cross section than the tapered bore 10 when the sleeve is in the tubular stem socket 5 whereby insertion of the tapered shank 16 into the tapered bore 10 tends to expand the sleeve and apply compressive stress to the shank and sleeve. It is preferable that the insert be made of the same material as the sleeve, for example, linear polyethylene. The sleeve member 8 preferably includes an exterior surface member such as a pressure-sensitive adhesive on the surface whereby the adhesive will contact the inner surface of the socket 5. It is preferable to apply a double face pressure-sensitive adhesive tape 27 to the outer surface of the sleeve with the outer surface of the tape covered by a removable strip 28 to protect the adhesive during the storage and handling of the sleeve. The pressure-sensitive adhesive should be tacky and capable of spreading slightly so as to cover the surfaces on which it is pressed. It should also be long life, with no age hardening, and a relatively small amount of crystallization. It is preferred that the tape member having the adhesive coating be of fabric, and it has been found that a suitable tape is available commercially and sold under the name of "Polykin 15" manufacture by Kendall Company, Walpole, Massachusetts. This is merely an example of a suitable double face pressure-sensitive tape, as other pressure-sensitive adhesive carriers are also available.

It is preferable that the annular rib 22 on the insert be interrupted to form a plurality of circumferentially spaced lugs 29 having a length corresponding to the width of longitudinal grooves 30 in the tapered bore 10 of the sleeve, the grooves 30 communicating with the annular groove 12 in said sleeve. This permits rotation of the insert to align the lugs 29 with the grooves 30 for removal of the insert from the sleeve. This will permit replacement of the glide if it should become worn; however, in using such a removable insert, the lugs are aligned with the areas of the sleeve bore between the longitudinal grooves and the insert driven into the sleeve to effect the expansion and cooperative engagement of the interfering tapers.

Figure 2:
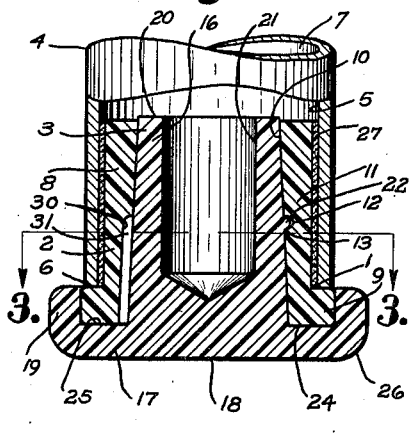
FIG. 2 is a longitudinal sectional view through the connector assembled in a tubular stem to form a furniture glide.
Figure 3:
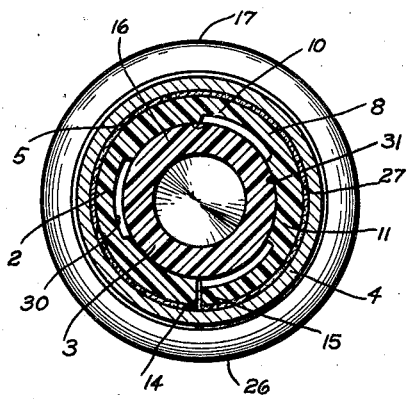
FIG. 3 is a transverse sectional view through the connector and tubular stem on the line 3—3, FIG. 2.

In using and assembling a glide or connector as illustrated in FIGS. 1 to 3 inclusive, with a hollow stem or furniture leg having a socket or bore 5 in the end thereof, the sleeve 2 with the pressure-sensitive tape therearound is grasped on the flange 9 and the tape cover 28 peeled from the tape to expose the outer face of the pressure-sensitive tape, the inner face of said pressure-sensitive tape being adhered to the outer surface of the sleeve portion 8. Pressure is then applied to the exterior of the flange 9 to compress the sleeve whereby the edges 15 substantially engage, and the tape covered portion of the sleeve is then slightly less in cross section than the inside of the bore or socket 5. The sleeve portion 8 is then inserted in the open end of said socket or bore until the flange 9 engages the open end of the hollow stem or leg and the flange is then released whereby the sleeve will expand and through its resiliency press the outer face of the tape against the inner face of the hollow stem. The insert 3 is then aligned with the tapered bore of the sleeve and partially inserted therein with the lugs 29 engaged with the lands 31 between the grooves 30. Then, by a blow on the surface 18, the insert is driven into the sleeve whereby the interfering tapers of the insert shank and taperer bore of the sleeve tends to compress the material of the sleeve wall and also expand said sleeve to exert pressure compressing the tape between the sleeve outer wall and the inner wall of the hollow stem. Also, the moving of the insert into the sleeve until the member 17 engages the bottom surface 24 of the flange 9 effects engagement of the annular rib 22 or lugs 29 in the groove 12 whereby the shoulders 13 and 23 are engaged to retain the insert in the sleeve. The pressure-sensitive adhesive anchors the sleeve in the hollow stem and the friction of the tapered surfaces on the sleeve and insert, together with the locking engagement of the shoulders 13 and 23, anchor the insert in the sleeve whereby substantial forces must be applied to remove the insert and/or sleeve from the hollow stem.

In structures wherein a substantial positive bond anchoring the sleeve and insert are not necessary, the pressure-sensitive tape can be omitted, and the expansion of the sleeve by the interfering tapers on the sleeve and insert will apply a force creating a frictional bond between the sleeve and hollow stem to retain the members in assembled relation.

Figure 4:
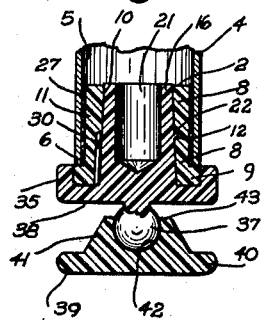
FIG. 4 is a longitudinal sectional view through a modified form of connector and support in assembled relation wherein the support includes a swivel member.

In the form of the invention illustrated in FIG. 4, the support is in the form of a swivel glide on the insert. The sleeve member 2 corresponds to the sleeve member illustrated in FIGS. 1 to 3 inclusive. The sleeve member 2 is inserted in a hollow stem or leg 4 and the structure of the sleeve is substantially the same as described relative to the form of the invention illustrated in FIGS. 1 to 3 inclusive. The insert member 35 is preferably substantially the same as the insert member 3 except said insert 35 has a ball member 37 extending downwardly from the lower face 38 of said insert. The glide 39 is preferably formed of linear polyethylene but may be formed of other suitable material and consists of a base portion 40 having an upstanding boss 41 with a spherical recess 42 therein with the center of the recess below the upper end 43 of the boss with the relative sizes of the recess and ball 37 being such that pressure applied to the glide and insert to move the ball into the recess 42 will snap same in place whereby the upper portion of the recess will retain the glide on the ball member. The assembly of the support in a hollow stem or leg is the same as described relative to the structure shown in FIGS. 1 to 3 inclusive.

Figure 5:
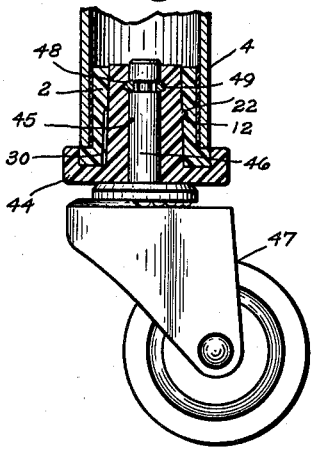
FIG. 5 is a longitudinal sectional view through a further modified form of connector with a caster mounted therein.

In the form of the invention illustrated in FIG. 5, the support is in the form of a caster. The tubular stem or leg 4 and sleeve 2 correspond in structure to that shown and described relative to FIGS. 1 to 3 inclusive. The insert 44 corresponds substantially in outer shape and contour to the structure described and shown in FIGS. 1 to 3 inclusive except that the insert has a through axial bore 45 to mount the stem 46 of a caster 47. The caster 47 and stem 46 are of conventional structure with a split ring 48 retaining the stem and caster assembled. The bore 45 of the insert 44 is preferably provided with a groove 49 for receiving the split ring 48 to retain the caster stem in the insert 44. In assembling the structure, the sleeve 2 is applied to the hollow stem or leg 4 and the insert 44 assembled therein as described relative to the structure illustrated in FIGS. 1 to 3. Then the stem 46 of the caster is inserted in the bore 45, the split ring 48 being compressed to slide in said bore until the split ring registers with the groove 49 which permits said split ring to expand into the groove to anchor the caster stem in the insert.

Figure 6:
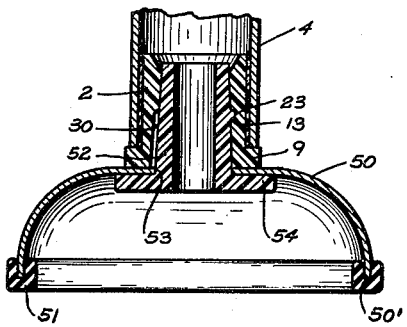
FIG. 6 is a longitudinal sectional view through a further modified form of the connector and support.

In the form of the invention illustrated in FIG. 6, the support includes an inverted cup-shaped base member 50 preferably having a resilient cushion member 51 suitably secured on the lower marginal portion 50' of said base member. The hollow stem or leg 4 and the sleeve member 2 are of the same structure and are assembled in the same manner as described relative to the structure illustrated in FIGS. 1 to 3 inclusive. The insert 52 is the same as the insert 3 except that the lower portion of the shank is slightly longer whereby the shank extends through a bore 53 of the base member and the portion of the base member surrounding said bore is engaged between the flange 54 of the insert 52 and the flange 9 of the sleeve to tightly hold said base when the shoulders 13 and 23 of the sleeve and insert are engaged. The assembly of the sleeve and hollow stem 4 is completed in accordance with the description relative to the structure shown in FIGS. 1 to 3 inclusive, and then the shank of the insert is extended through the bore 53 and the end of said tapered shank of the insert inserted into a tapered bore of the sleeve whereby the wall of the base is between the flange 54 and the flange 9. Then a blow on the flange portion 54 of the insert effects the final assembly to expand the sleeve and engage the shoulders of the annular rib and groove in the insert in the sleeve.

Figure 7:
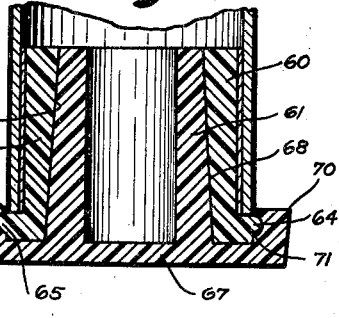
FIG. 7 is a longitudinal sectional view through the connector with an adjustable glide therein.

In the form of the invention illustrated in FIG. 7, the sleeve 2 is of the same structure as illustrated in FIGS. 1 to 3 inclusive and is assembled in the hollow stem or leg 4 in the same manner. The insert 55 is preferably of metal and has a threaded axial bore 56 into which is screwed a threaded stem 57 with a lock member such as a nut 58 on said threaded member and engaging the bottom of the insert. The lower end of the threaded member 57 has a glide member 59 suitably secured thereon whereby loosening of the nut 50 and turning of the threaded member will adjust the height at which the leg will be supported from a floor or the like whereby this structure provides an adjustable or leveling glide.

Figure 8:
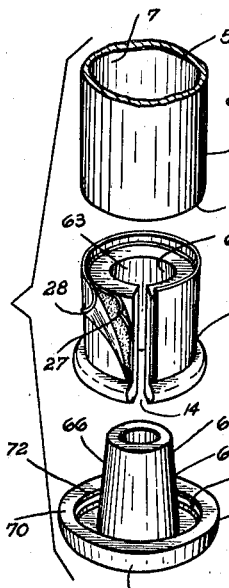
FIG. 8 is a disassembled perspective view of the modified form of the sleeve and insert with the interengaging locking portions on the lower ends thereof.
Figures 9, 10:
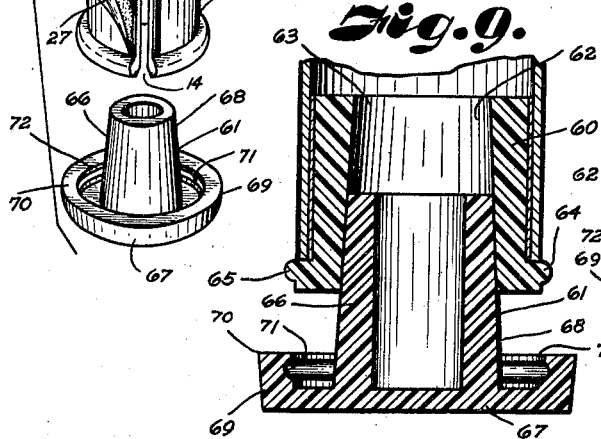
FIG. 9 is a longitudinal sectional view through the modified form of connector shown in FIG. 8 in partially assembled position.
FIG. 10 is a longitudinal sectional view through the modified form of connector shown in FIGS. 8 and 9 assembled in a tubular stem to form a furniture glide.

In the form of the invention illustrated in FIGS. 8 to 10 inclusive, the sleeve member 60 and the insert 61 differs from the sleeve member 2 and insert 3 illustrated in FIGS. 1 to 3 inclusively by having the cooperative interlocking portions at the lower ends of the sleeve and insert. The sleeve member 60 has a bore 62 extending longitudinally thereof and being axial and tapered whereby the sides of the tapered bore 62 converge from the flange end of the sleeve to present a smooth inner face 63 for the full length of said tapered bore 62. The annular flange 64 on the lower end of the sleeve or at the large end of the bore 62 is of suitable size whereby it extends outwardly beyond the outer surface of the tubular stem 4 when the sleeve is assembled therein, the periphery of said flange having an annular bead or rib 65 forming a locking portion engageable with the insert as later described. The insert 61 has a tapered shank portion 66 extending upwardly from a support portion 67 that will form a glide for supporting furniture and the like. The shank portion 66 has a smooth uninterrupted outer surface 68 that is slightly larger in diameter than the cross section of the tapered bore 62 of the sleeve when the sleeve is in the tubular stem socket 5 whereby insertion of the tapered shank 66 into the tapered bore 62 tends to expand the sleeve and apply compressive stress to the shank and sleeve, in the same manner as the tapered shank 16 tended to expand the sleeve 2 in the form of the invention illustrated in FIGS. 1 to 3 inclusive. It is preferable that the sleeve and insert be made of the same material, for example, linear polyethylene. The support portion or bottom member 67 of the insert extends outwardly from the large end of the tapered shank 66 and then upwardly as at 69 providing an upstanding flange 70 adapted to surround the exterior of the flange 64 on the sleeve member 60, when assembled as illustrated in FIG. 10. The upstanding flange 70 has an interal groove 71 adapted to receive the bead or rib 65 when the insert and sleeve are assembled. The size of the annular rib or bead 65 and the internal size of the upstanding flange 70 and the groove 71 therein is such that the portion 72 above the groove 71 is smaller in diameter than the external diameter of the periphery of the bead 65 whereby when the insert and sleeve are assembled as illustrated in FIG. 10, the upper portion 72 snaps over the bead 65 to cooperate therewith in providing interengaging portions on the sleeve and insert to retain them in assembled relation. The sleeve 60 has pressure-sensitive adhesive in the form of double face pressure-sensitive adhesive tape 27 on the outer surface of the sleeve with the outer surface of the tape covered by a removable strip 28 to protect the adhesive during storage and handling of the sleeve in the same manner as in the sleeve 2 in the form of the invention illustrated in FIGS. 1 to 3 inclusive.

In assembling this structure, the sleeve 60 is applied to the hollow stem or leg 4 and the insert 61 assembled therein substantially in the same manner as described relative to the structure illustrated in FIGS. 1 to 3 inclusive, and then the supporting portion or bottom 67 will serve as a furniture glide in the same manner. It is also to be understood that other types of supporting members may be applied to the insert 61 substantially in the same manner as they are applied to the insert 3 as illustrated in FIGS. 4, 5 and 7.

The forms of the support illustrated are merely exemplary to show the adaptability of the connector for the various forms of support and other types of casters or glides may be used in the connector structure.

It is to be understood that while I have illustrated and described certain forms of my invention, it is not to be limited to the specific forms or arrangements of parts herein described and shown except insofar as such limitations are included in the claim.

What I claim and desire to secure by Letters Patent is:

A connector for use with the end of a tubular stem having an open bore, said connector comprising a tubular sleeve of flexible material having an external surface member defining an exterior cross section substantially corresponding to that of said open bore for extending into the bore of said tubular stem, said tubular sleeve having a tapered bore with the surface thereof converging toward the end of the sleeve extending into said tubular stem, said sleeve and external surface member being slotted longitudinally thereof whereby compression reduces the external size for free insertion into the open bore of the tubular stem and normal resiliency of the sleeve opens the slot and expands said sleeve and external surface member to an exterior size larger than the bore of said tubular stem to effect contact of said external surface member and said tubular stem and exert pressure between said contacting portions of the external surface member and tubular stem, an insert member having a shank with a tapered exterior substantially corresponding in taper to the tapered bore of the sleeve for extending into said sleeve, said tapered shank being slightly larger than the tapered bore of the sleeve whereby forcing of said shank into said tapered bore expands said sleeve and compresses the walls of said sleeve and external surface member between the tubular stem and shank providing an engagement holding the insert and sleeve in the tubular stem, an annular rib on the tubular sleeve adjacent the large end of the tapered bore, and a flange on the large end of the insert shank and having a recess receiving said annular rib when the shank is fully inserted in the sleeve, said flange on the insert shank having a portion engaging over the annular rib to lock the insert in said sleeve.

References Cited in the file of this patent

UNITED STATES PATENTS

| | | |
|---|---|---|
| 780,684 | Pratt | Jan. 24, 1905 |
| 857,987 | Flamache et al. | June 25, 1907 |
| 1,582,211 | Fleming | Apr. 27, 1926 |
| 1,879,429 | Noelting et al. | Sept. 27, 1932 |
| 1,929,743 | Jarvis et al. | Oct. 10, 1933 |
| 2,428,932 | Fawick | Oct. 14, 1947 |
| 2,501,465 | Caramanoff | Mar. 21, 1950 |
| 2,513,193 | Miller | June 27, 1950 |
| 2,644,978 | Becker | July 14, 1953 |
| 2,850,759 | Petri | Sept. 9, 1958 |
| 2,876,485 | Cowles | Mar. 10, 1959 |